United States Patent Office 3,485,904
Patented Dec. 23, 1969

3,485,904
METHOD UTILIZING AN ORGANOPOLYSILOXANE BINDER TO MAKE CERAMIC ARTICLE
Leon J. Ostrowski, Midland, Mich., assignor to Dow Corning Corporation, Midland, Mich., a corporation of Michigan
No Drawing. Filed July 18, 1966, Ser. No. 565,749
Int. Cl. C04b 35/64, 39/00
U.S. Cl. 264—63                                      8 Claims

ABSTRACT OF THE DISCLOSURE

A method of making a heat shrinkable material using particular organopolysiloxane block copolymers and ceramic materials whereby uniform mixtures of the resin and ceramic materials are hot molded to shape, cooled, removed from the mold, treated in an $NH_3$ atmosphere, distorted to a different shape, such as expanding a tube shaped article so that it can be fitted over a conduit, and heated to 500° C.–1500° C. to shrink the distorted shape and to form ceramic bonds among the inorganic particles.

---

This invention relates to heat shrinkable organosilicon compositions which can be ceramified.

Compositions which alter their shape on the application of heat play an extremely important role in numerous commercial applications, particularly in the electrical industry and the like. For example, many electrical articles can be fitted with a jacket of material which exhibits heat shrinkability that is considerably larger than the diameter of the article and then the jacket subsequently heated to cause it to shrink to produce a very tight fitting coating. Such materials are also useful in caulking applications wherein the stretched material is placed in the seam and subsequently heated. It thereupon shrinks in length and expands in cross-section thereby forming a tight seam.

In addition, articles that are capable of ceramification are also widely employed in industrial applications particularly in those cases where a combination of dimensional stability, chemical inertness, and good electrical insulation are required. Despite some mechanical disadvantages such as brittleness, ceramic articles are frequently desired because they remain unchanged after long periods of operating at temperatures in the range of 300° C. or above.

For example, a ceramic material gives off no volatiles and does not crack due to aging or chemical reactions taking place over extended periods of time at elevated temperatures.

Thus, to provide materials which possess characteristics of both heat shrinkability and ceramification would be highly desirable and adantageous. Such materials would allow fabricators to produce articles with a tight fitting and ceramified coating making available the attendant advantages obtainable therefrom.

In addition, one can prepare heat expandable tubing wherein the tubing is extended longitudinally during heating and subsequently cooled resulting in a contraction of the tube diameter at the same time the length is extended. Thereafter, the tube can be appropriately positioned in a pipe and heat briefly applied so that the tubing returns to its original reticulated state permitting the tubing to be engaged directly to the interior of the pipe, forming a lining on said pipe. Following this, the lining can be further heated resulting in ceramification whereby a tight fitting ceramified inner lining is provided. A material displaying such advantages would be especially suitable for conduits and the like.

A further application of this invention concerns the use of memory cores for computer devices. Circular memory cores are frequently employed in computer devices, and the smaller the diameter of the core, the more efficient the computer. In the past, the cores have been reduced in size as far as practicable while still conforming to necessary handling procedures. The present invention allows for the possibility of being able to handle memory cores and ultimately reduce their diameter after they are placed in the computer device so that its diameter is reduced to an extent heretofore unknown. As a result, the computer is more efficient and the invention herein defined is of extreme commercial importance.

It is thus an object of this invention to provide materials which can be both heat shrinkable and ceramifiable.

It is also an object of the present invention to provide materials possessing the advantages of both heat shrinkability and ceramification such as tight-fitting coatings that have excellent thermal stability, are chemically inert, and will not distort due to aging or subjection to elevated temperatures for long and indefinite periods of time.

These and other objects will become readily apparent from the following detailed description of the invention.

This invention relates to a method comprising (A) heating an article formed from a mixture of (1) a resinous organopolysiloxane block copolymer consisting essentially of (a) polymer blocks of the average structure

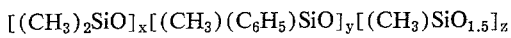

in which the sum of $x+y+z$ has an average value of from 6 to 100 inclusive, and $y$ and $z$ each have a value of up to 10 percent of the sum of $x+y+z$, and (b) polymer blocks of the average unit formula

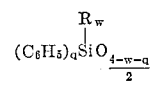

in which R is an alkyl or alkenyl radical of less than 6 carbon atoms, $q$ has an average value of from 1.0 to 1.3 inclusive and $w$ has an average value of up to 0.3 inclusive, the siloxane units in (a) being from 10 to 75 mol percent and the siloxane units in (b) being from 25 to 90 mol percent of the total siloxane units in said block copolymers, the minimum mol percent of siloxane units (b) when the sum of $x+y+z$ has an average value of from 50 to 100 being determined by the equation $$50M/S + 0.1S = 30$$

where M is the minimum mole percent of siloxane units (b), and S is the sum of $x+y+z$, with (2) from 10 to 60 percent by volume of the ceramic material based on the total volume of (1) and (2) having a softening point above 800° C., said ceramic material being essentially free of materials which volatilize below 800° C., at a temperature of 50° C. to 300° C. whereby the said article is altered in dimension, and (B) thereafter ceramifying said article by further heating to a temperature above 500° C. to 1550° C.

It is of importance to note that the essentially block character of the copolymer must be obtained or the desired advantages are not achieved. Hence, the limitation of an average of at least six siloxane units in the essentially dimethylsiloxane block is critical. When the average block length is less than six siloxane units, the resulting copolymer fails to cure to a resin having the desired properties.

The above-stated maximum average siloxane unit length of component (a) cannot be exceeded, because compositions made with (a) components wherein the average sum of $x+y+z$ exceeds 100 produce inferior materials on curing which are neither strong nor resinous. Between the two stated limits, good strong resins are obtained, with flexibility of the resin increasing with the longer average siloxane unit length of component (a), other factors being equal.

Siloxane block unit (a) is an essentially dimethylpolysiloxane block having an average siloxane unit length as related above. Small amounts of phenylmethylsiloxane units (not to exceed 10 mol percent of the total siloxane units of component (a)) can be tolerated, replacing some of the dimethylsiloxane units, and are beneficial when modification of the melting point of the resins of the present invention is desired. In addition, small amounts, not to exceed 10 mol percent, of monomethylsiloxane units can be present in siloxane units (a). The inclusion of monomethylsiloxane units serve purposes similar to the phenylmethylsiloxane units, with the exception that the softening effect on the cured resin due to the phenylmethylsiloxane units in this component is not present when monomethylsiloxane units are employed.

Both the phenylmethylsiloxane units and monomethylsiloxane units are optionally present. Each type of unit can be present up to the maximum stated, and in addition both types of units can be present in either random or specific locations in the block unit (a). Preferably, one or the other type of unit other than dimethylsiloxane unit is present; preferably these units are present in amounts less than 5 mol percent of the siloxane units of polymer block (a); it is most preferable that they be present in no more than 2 mol percent of the siloxane units of polymer block (a); and they can both be essentially completely absent from polymer block (a), in which case the block is primarily a dimethylpolysiloxane.

As stated above, the average block size of polymer block (a) can be from 6 to 100 inclusive. It is to be understood that these figures are only average figures, and as is the case with all polymeric materials, there are portions of the siloxane having siloxane unit lengths both longer and shorter than the average. This is common in the organosilicon polymer field as well as in the organic polymer field. The performance of the composition of this invention, or its integrity, is not dependent upon the distribution of various siloxane unit lengths in siloxane block (a), but only on the average siloxane unit length of the blocks, or "average block size."

Polymer block (b) contains units of the formula such as $C_6H_5SiO_{1.5}$, $(C_6H_5)_2SiO$, $C_6H_5(R)SiO$ and $RSiO_{3/2}$ wherein R is an alkyl or alkenyl radical of less than 6 carbon atoms such as methyl, ethyl, propyl, isopropyl, butyl, isobutyl, amyl, vinyl, allyl, methallyl, $CH_2=CHCH_2CH_2—$, and $CH_2=CHCH_2CH_2CH_2—$. Preferably, $C_6H_5(CH_3)SiO$ and/or $(C_6H_5)_2SiO$ units are present in no more than 10 mol percent of the units of polymer block (b). The presence of these units in polymer block (b) provides a lowered melting point for the copolymer and increased flexibility and softness in the cured resin. Thus, where these properties are desired the inclusion of phenylmethylsiloxane units or of diphenylsiloxane units in polymer block (b) becomes quite desirable.

The location of the siloxane units in (b) is not critical. These units, when present, can be located randomly or specifically without affecting the performance or characteristics of block (b), the instant composition, or the resin cured therefrom.

The average size of polymer block (b) is dependent on both the average size of blocks (a) and the mol percentage of (b) and (a). It has been found that when these variables are fixed, the average block size of (b) is also fixed and hence, specification of this block size is unnecessary.

As stated above, from 10 to 75 mol percent (based on the total number of siloxane units) of the composition of this invention can be polymer block (a). When less than 10 mol percent of polymer block (a) is present, the composition cures to a resin that is substantially less shock resistant then prior art resins. When more than 75 mol percent of the present composition is comprised of (a) units, the composition does not cure to a resin, but rather to a soft cheesy rubber having little strength. The maximum mol percent of (a) units present in the block copolymer is closely related to the average number of siloxane units per block (a) particularly when the average number of siloxane units per block (a) is from 50 to 100 inclusive units. The block copolymers of the invention are essentially composed of two types of blocks; those blocks containing essentially dimethylsiloxane units (a), and those blocks containing essentially monophenylsiloxane units (b). When the mol percent of either (a) units or (b) units is fixed, the other mol percent is immediately known. The minimum mol percent of siloxane units (b), when the average number of units per block (a) is from 50 to 100 units, is determined by the equation $$50M/S + 0.1S = 30$$

where M is the minimum mol percent of siloxane units (b) and S is the sum of $x+y+z$. The maximum mol percent of siloxane units (a) when the average number of units per block (a) is from 50 to 100 units is equal to 100 minus the minimum mol percent of siloxane units (b). For example, when $x+y+z$ is equal to 80, the minimum mol percent of siloxane units (b) is 35.2 mol percent and the maximum mol percent of siloxane units (a) is 64.8 mol percent. The equation shown above only applies when the average number of units per block (a) is from 50 to 100 units. When the average number of units per block (a) is below 50 units, the equation is not applicable. The minimum mol percent of polymer block (a) and the maximum mol percent of polymer block (b) is not altered in any manner. The minimum mol percent of siloxane units (b) determines that percentage below which the block copolymers do no have thermal shock resistance. Between the limits stated above, compositions are obtained which cure to good strong resinous materials having the properties earlier described. Generally, the higher the mol percentage of (a) the more flexible and soft the resulting resin. A preferred range is 25 to 65 mol percent of (a) with the balance of (b); even more preferred in numerous cases is a range of from 40 to 65 mol percent of (a) and the balance of (b).

By the term "consisting essentially" of as employed herein, it is simply meant that the block copolymers herein described can also be linked by coupling units such as $SiO_2$,

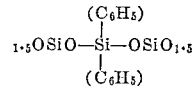

$_{1.5}OSiOSiO_{1.5}$, and $_{1.5}OSiSiO_{1.5}$, among others.

The resins employed in this reaction can be prepared in several ways. One method comprises reacting (i) a phenyltrihalosilane of the formula $(C_6H_5)SiX_3$, in which X is a halogen atom such as chlorine, bromine, fluorine, or iodine with (ii) a hydroxylated polysiloxane of the average structure $$[(CH_3)_2SiO]_x[(CH_3)(C_6H_5)SiO]_y—[(CH_3)SiO_{1.5}]_z$$

in which the sum of $x+y+z$ has an average value of from 6 to 50 inclusive, and y and z each have a value not exceeding 10 percent of the sum of $x+y+z$, there being an average of at least two silicon-bonded hydroxyl radicals per molecule of said polysiloxane, in an amount such that there is at least one mol of $(C_6H_5)SiX_3$ per mol of silicon-bonded hydroxyl radicals in the hydroxylated polysiloxane under such conditions that by-produced hydrogen halide is removed substantially as it is formed.

The above reaction product is then cohydrolyzed with (iii) a halosilane of the average formula $$(C_6H_5)_q—R_wSiX_{4-w-q}$$

in which R and X are as above defined, q has a value such that in the total components cf (i)+(iii) there is from 1 to 1.3 inclusive $C_6H_5$-radicals per silicon atom and w has a value such that in the total (i)+(iii) there can be a maximum of 0.3 inclusive R radicals per silicon atom, such that the sum total mol percent of silicon atoms in $(C_6H_5)SiX_3$ of (i) and $$R_w(C_6H_5)_qSiX_{4-w-q}$$

of (iii) comprise from 90 to 25 mol percent inclusive of the total silicon atoms in (i), (ii) and (iii) and silicon atoms in (ii) comprise from 10 to 75 mol percent inclusive of the total number of silicon atoms in (i), (ii) and (iii).

This method and other alternative methods for preparing the organopolysiloxane resins of this invention can be found in U.S. application Ser. No. 361,258, filed on Apr. 20, 1964, and is hereby incorporated by reference.

The ceraminc materials employed in this invention can be any ceramic material having a softening point above 800° C. which is volatile-free. The term "volatile-free" simply means that the ceramic material is free of water, carbonate or other materials which volatilize at temperatures below 800° C. In general, ceramic materials such as clay, aluminum silicate, magnesium silicate, hydrated alumina, hydrated silica, and the like will give up their water of hydration by heating to temperatures at or below 500° C. Those naturally occuring ceramic materials such as asbestos, mica, or hydrated clays are unsatisfactory for use in this invention. Hydrated clays can be made satisfactory by calcining prior to use.

The term "ceramic material" as employed herein includes any non-metal inorganic water-insoluble material having a softening or decomposition point above 800° C. This includes such materials as asbestos, and mica. Specific examples of operable ceramic materials are aluminum silicate, magnesium silicate, zinc oxide, magnesium oxide, tungsten carbide, titanium carbide, molybdenum carbide, lithium aluminate, silicon nitride, boron nitride, aluminum oxide, silica, zirconia, beryllia, titania, silicon carbide, potassium titanate, zinc silicate, zirconium silicate, and titanium silicate, and mixed silicates such as calcium aluminum silicate, magnesium aluminum silicate, and lithium aluminum silicate. The ceramic material can be derived either from a natural source such as sand, clay, or the like or it can be an artificial material such as fume silica.

For purposes of this invention the ceramic material can be in the form of either granules or fibers. The particle size or fiber diameter is not critical but can vary depending upon the properties desired in the mixture.

It is to be further noted that as hereinbefore related, there can be from 10 to 60 percent by volume of a ceramic material based on total volume of (1) and (2) present, although it has been found that from 20 to 50 percent by volume of a ceramic material is to be preferred. For example, excellent heat shrinkable ceramic articles were obtained when 35 percent by volume of a ceramic material was employed. When more than 60 percent by volume of a ceramic material was used, the characteristic of heat shrinkability were inferior, whereas when less than 10 percent by volume of a ceramic material was used the ceramification was impaired and the finished article had virtually no integrity and was very weak and brittle.

The heat shrinkable ceramic compositions of this invention are easily and readily prepared by simply admixing or contacting the above resins with the ceramic material by hand or by other convenient and known methods such as a rubber mill or the like. The admixture can contain an appropriate catalyst such as a quarternary ammonium compound or any silanol condensation catalyst at which point it is then heated to a temperature of approximately 150° C. so that it will crosslink and form the desired 3-dimensional system capable of displaying heat shrinkable characteristics. The above effect can be derived at room temperature, however for practical purposes and to facilitate the reaction, temperatures of from 50° C. to about 300° C. are employed. The resin is then deformed by any feasible means such as by placing in a heated press, mechanical elongation or the like, then cooled so that the resin retains its distorted state. The catalyst need not be present in the admixture of resin and ceramic material, in which case the admixture would have to be treated in an NH₃ atmosphere to obtain the necessary heat shrinkable characteristics. However due to the obvious advantage of being able to cure the material more rapidly, it is desired that the catalyst be originally present. It is essential for the production of the materials of this invention that the mixture of resin and ceramic material be heated at a temperature above 500° C. to obtain ceramification. The heating is generally carried out until no further weight loss is observed. Normally this can be accomplished by heating at 500° C. to 800° C. or 1550 C. for 2 to 24 hours.

If so desired, one can employ optional ingredients in the compositions defined herein. For example, one can include release agents such as calcium stearate or pigments to impart a desired color.

The following examples are illustrative only and are not intended to limit the invention which is properly delineated in the claims.

EXAMPLE 1

40 grams of a resin consisting of 60 mol percent polymer blocks of the formula $(CH_3)_2SiO$ containing on the average of from 34 to 38 dimethyl units per block and 40 mol percent polymer blocks consisting of 90 mol percent $(C_6H_5)SiO_{3/2}$ and 10 mol percent $(CH_3)(C_6H_5)SiO$ was melted on a two-roll mill. To the melted resin was added 93 grams of $Al_2O_3$ which was blended for 5 to 30 minutes until a good dispersion was obtained. The samples were then removed from the mill and cooled to room temperture. The samples were then pressed into 4″ x 4″ x 1/16″ slabs by melting on a hot press. The press was cooled and the samples stripped and cut out of the mold. The molded samples were treated for 24 hours in an atmosphere on NH₃. The treated samples were then expanded by pressing 1½″ discs to 2″. A ring was then cut from one of the discs and shrunk back to its original size when heated.

The ring was then fired to a temperature of 700° C. and it was readily ceramified.

EXAMPLE 2

When the following resins are substituted for the corresponding resins of Example 1, equivalent results are obtained.

(A) 10 mol percent of blocks of units of the formula

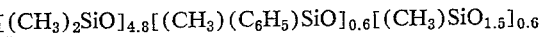
$$[(CH_3)_2SiO]_{4.8}[(CH_3)(C_6H_5)SiO]_{0.6}[(CH_3)SiO_{1.5}]_{0.6}$$

and 90 mol percent of blocks of the unit formula consisting of 90 percent $(C_5H_6)SiO_{3/2}$ and 10 percent $CH_3SiO_{3/2}$.

(B) 50 mol percent of blocks of units of the formula $[(CH_3)_2SiO]_{25}$, and 50 mol percent of blocks of the unit formula consisting of 100 percent $(C_6H_5)SiO_{3/2}$.

(C) 75 mol percent of blocks of units of the formula $[(CH_3)_2SiO]_6$, and 25 mol percent of blocks of the unit formula consisting of 5 percent $(C_6H_5)CH_3SiO_{3/2}$ and 95 percent $(C_6H_5)SiO_{3/2}$.

(D) 33 mol percent of blocks of units of the formula

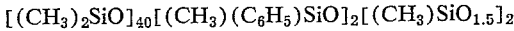
$$[(CH_3)_2SiO]_{40}[(CH_3)(C_6H_5)SiO]_2[(CH_3)SiO_{1.5}]_2$$

and 67 mol percent of blocks of the unit formula consisting of 92 percent $(C_6H_5)SiO_{3/2}$ and 8 percent $(C_6H_5)SiO_{3/2}$.

(E) 60 mol percent of blocks of units of the formula $[(CH_3)_2SiO]_{100}$, and 40 percent of blocks of the unit formula consisting of 100 percent $(C_6H_5)SiO_{3/2}$.

(F) 70 mol percent of blocks of units of the formula

$$[(CH_3)_2SiO]_{46}[(CH_3)(C_6H_5)SiO]_2[(CH_3)SiO_{1.5}]_2$$

and 30 mol percent of blocks of the unit formula consisting of 93 percent $(C_6H_5)SiO_{3/2}$ and 3 percent $(CH_3)SiO_{3/2}$.

EXAMPLE 3

When the following proportions* of resin to ceramic material are substituted for the corresponding proportions of Example 1, equivalent results are obtained.

| Percent resin: | Percent ceramic material |
|---|---|
| (A) 90 | 10 |
| (B) 85 | 15 |
| (C) 75 | 25 |
| (D) 55 | 45 |
| (E) 50 | 50 |
| (F) 40 | 60 |

* All proportions are on the basis of volume percent.

EXAMPLE 4

When the following ceramic materials are substituted for the corresponding ceramic materials of Example 1, equivalent results are obtained.

(A) Lithium aluminum silicate
(B) Silicon carbide
(C) Zinc oxide
(D) Lithium aluminate
(E) Zirconium silicate
(F) Silicon nitride
(G) Tungsten carbide
(H) Ferric oxide
(I) Aluminum oxide
(J) Zirconium oxide

EXAMPLE 5

The mixture of Example 1 was formed into a tube and the resin cured as shown in that example. The tube is expanded by air pressure from a diameter of 1½ inches to a diameter of 2 inches. A 1¾ inch steel pipe was inserted in the tube and the assembly heated at 100° C. to shrink the resin tube tightly around the pipe. The assembly was then heated at 700° C. to produce a ceramic coating on the pipe.

EXAMPLE 6

50 grams of a resin consisting of 60 mol percent of polymer blocks consisting of 8.34 mol percent $$CH_2=CHSiO_{3/2}$$

and 91.66 mol percent $(C_6H_5)SiO_{3/2}$ and 40 mol percent of polymer blocks of the formula $(CH_3)_2SiO$ containing on the average of from 34 to 38 dimethyl units per block was melted on a 2-roll mill. To the melted resin was added 150 grams of red iron oxide which was blended until a good dispersion was obtained. The samples were then removed from the mill and cooled to room temperature. The samples were then pressed into 4″ x 4″ x 1/16″ slabs by melting on a hot press. The press was cooled and the samples stripped and cut out of the mold. The molded samples were treated in an atmosphere of $NH_3$ and then expanded by pressing 1/12″ discs to 2″. A ring was then cut from one of the discs and shrunk back to its original size when heated.

The ring was then fired to a temperature of 1550° C. and it was readily ceramified.

EXAMPLE 7

When the rings of Example 5 were fired to the following temperatures, ceramics possessing excellent properties were obtained.

(A) 500° C.
(B) 600° C.
(C) 850° C.
(D) 1400° C.
(E) 1500° C.

EXAMPLE 8

When the following polymer blocks were substituted for the vinyl siloxane unit of Example 5, equivalent results were obtained.

(A) $CH_3CH_2CH_2SiO_{3/2}$
(B) $CH_3CH_2CH_2CH_2CH_2SiO_{3/2}$
(C) $CH_2=CHCH_2CH_2SiO_{3/2}$
(D) $CH_2=CHCH_2CH_2CH_2SiO_{3/2}$

EXAMPLE 9

50 grams of a resin consisting of 80 mol percent polymer blocks consisting of 75 mol percent $(C_6H_5)SiO_{3/2}$ and 25 mol percent $(C_6H_5)_2SiO$ and 20 mol percent of polymer blocks of the formula $(CH_3)_2SiO$ containing on the average from 34 to 38 dimethyl units per block was melted on a 2-roll mill. To the melted resin was added 150 grams of red iron oxide which was blended until a good dispersion was obtained. The samples were then removed from the mill and cooled to room temperature. The samples were then pressed into 4″ x 4″ x 1/16″ slabs by melting on a hot press. The press was cooled and the samples stripped and cut out of the mold. The molded samples were then treated in an atmosphere of $NH_3$ and then expanded by pressing 1½″ discs to 2″. A ring was then cut from one of the discs and shrunk back to its original size when heated.

The ring was then fired to a temperature of 800° C. and it was readily ceramified.

EXAMPLE 10

When a resin consisting of 45 mol percent polymer blocks of the formula $(C_6H_5)SiO_{3/2}$ and 55 mol percent polymer blocks of the formula $(CH_3)_2SiO$ was substituted for the corresponding resin of Example 8, equivalent results were obtained.

That which is claimed is:

1. A method of making a ceramic article comprising the steps of
   (A) providing a uniform mixture of
      (1) a resinous organopolysiloxane block copolymer consisting essentially of
         (a) polymer blocks of the average structure
         $(CH_3)_2SiO_x(CH_3)(C_6H_5)SiO)_y(CH_3)SiO_{1.5})_z$
         in which the sum of $x+y+z$ has an average value of from 6 to 100 inclusive, and $y$ and $z$ each have a value of up to 10 percent of the sum of $x+y+z$, and
         (b) polymer blocks of the average unit formula $$(C_6H_5)_q-\underset{R_w}{SiO_{\frac{4-w-q}{2}}}$$

in which R is an alkyl or alkenyl radical of less than 6 carbon atoms inclusive, $q$ has an average value of from 1.0 to 1.3 inclusive and $w$ has an average value of up to 0.3 inclusive, the siloxane units in (a) being from 10 to 75 mol percent and the siloxane units in (b) being from 25 to 90 mol percent of the total siloxane units in said block copolymer, the minimum mol percent of siloxane units (b), when the sum of $x+y+z$ has an average value of from 50 to 100 being determined by the equation $50M/S+0.1S=30$, where M is the minimum mol percent of siloxane units (b) and S is the sum of $x+y+z$, with
      (2) and from 10 to 60 percent by volume of a ceramic material, based on the total volume of (1) and (2), having a softening point above 800° C. and being essentially free of materials which volatilize below 800° C., said ceramic material selected from the group consisting of aluminum silicate, magnesium silicate, zinc oxide, magnesium oxide, ferric oxide, aluminum oxide, tungsten carbide, titanium carbide, molybdenum carbide, lithium aluminate, silicon nitride, boron nitride, zinc silicate, calcium aluminum silicate, magnesium aluminum silicate, and lithium aluminum silicate, (B) forming the mixture of step A into the desired shape by hot pressing, (C) cooling the pressed shape of step B, (D) removing the cooled shape of step C from the mold, (E) treating said shape in an atmosphere of $NH_3$ for a time sufficient to crosslink and form the three-dimensional system in the resin to render it heat shrinkable, (F) distorting the shape produced by step E to a different shape having at least one dimension greater than that same dimension of the shape produced by step E, (G) heating the distorted shape produced by step F to a temperature of from 500° C. to 1550° C. to shrink said shape and to form ceramic bonds among the ceramic particles in said shape.

2. The method as recited in claim 1 wherein $y$ and $z$ of the block copolymer (1) each have a value of 0.

3. The method as recited in claim 2 wherein $w$ has an average value of up to 0.05 inclusive.

4. The method as recited in claim 3 wherein there is from 20 to 50 percent by volume of the ceramic material (2) based on the total volume of (1) and (2).

5. The method as recited in claim 1 wherein there is 35 percent by volume of ferric oxide based on the total volume of (1) and (2).

6. The method as recited in claim 1 wherein the siloxane units in polymer block (A) are from 45 to 65 mol percent and the siloxane units in polymer block (B) are from 35 to 60 mol percent of the total siloxane units in the organopolysiloxane resin (1).

7. The method as recited in claim 1 wherein the organopolysiloxane resin (1) consists essentially of 60 mol percent polymer blocks of the formula $(CH_3)_2SiO$ containing 34 to 38 dimethyl units and 40 mol percent polymer blocks consisting of 90 mol percent $(C_6H_5)SiO_{3/2}$ and 10 mol percent $(CH_3)(C_6H_5)SiO$.

8. The method as recited in claim 7 wherein there is 35 percent by volume of $Al_2O_3$ based on total volume of (1) and (2) and the article is ceramified at a temperature of from 700° C. to 1550° C.

References Cited

UNITED STATES PATENTS

| | | | |
|---|---|---|---|
| 2,641,044 | 6/1953 | Bearer | 25—156 |
| 2,967,338 | 1/1961 | Cooper | 22—194 |
| 3,004,859 | 9/1961 | Lichtenwalner | 106—308 |
| 3,116,157 | 12/1963 | Burbach | 106—69 |
| 3,328,481 | 6/1967 | Vincent | 260—825 |

OTHER REFERENCES

A. E. Dodd: "Dictionary of Ceramics," 1964, pp. 53 and 112.

JULIUS FROME, Primary Examiner

J. H. MILLER, Assistant Examiner

U.S. Cl. X.R.

106—287; 264—56, 60, 61, 63, 65, 82